United States Patent [19]
Mita

[11] Patent Number: 4,956,547
[45] Date of Patent: Sep. 11, 1990

[54] APPARATUS FOR SENSING INFORMATION ON BOTH SIDES OF DOCUMENTS

[75] Inventor: Kikuo Mita, Tokyo, Japan

[73] Assignee: Eastman Kodak Company, Rochester, N.Y.

[21] Appl. No.: 398,696

[22] Filed: Aug. 25, 1989

[30] Foreign Application Priority Data

Sep. 28, 1988 [JP] Japan .................................. 63-242865

[51] Int. Cl.$^5$ .............................................. H01J 40/14
[52] U.S. Cl. .................................. 250/208.1; 358/482
[58] Field of Search .......................... 250/208.1, 578.1; 355/23, 68; 358/478, 482, 483, 487, 496

[56] References Cited

U.S. PATENT DOCUMENTS 4,475,128  10/1984  Koumura .............................. 358/482

Primary Examiner—David C. Nelms
Assistant Examiner—Sherrie Hsia
Attorney, Agent, or Firm—Raymond L. Owens

[57] ABSTRACT

In a document for sensing information, while the document to be sensed is fed in one direction, both surfaces of the document are illuminated by the respective sources of light. Light reflected by one and then the other surface of the document alternately reach a one-dimensional image pickup element. The light sources may be turned on and off. Alternately, the sources of light may be left on, in which case light reflected by both surfaces of the subject are intermittently interrupted.

6 Claims, 3 Drawing Sheets

APPARATUS FOR SENSING INFORMATION ON BOTH SIDES OF DOCUMENTS

BACKGROUND OF THE INVENTION

1. Field of the Invention

This invention relates to an apparatus for sensing or reading information on the front and back surfaces of documents.

2. Description of the Prior Art apparatus, when it is desired to read information existing on both the front and back surfaces of an original document sheet, the apparatus is ordinarily operated first to read the information existing on one surface of the original sheet and second to read the information existing on the opposite surface thereof. It is therefore necessary to reverse the original document after the completion of the first reading operation and before the commencement of the second reading operation Generally, such reversing of the original document is manually made by the operator. Alternatively, the apparatus may be provided with a mechanism for automatically reversing the original document to eliminate the operator's manual operation. However, the provision of such a mechanism results in an increase in cost and decrease in reliability of the apparatus.

An improved apparatus is also known in which a pair of image pickup sensors are provided to be disposed facing respectively the front and back surfaces of the original sheet so that the information existing on both surfaces of the original sheet can be simultaneously read by the apparatus. However, such an apparatus also leads to the problem of high cost and low reliability.

SUMMARY OF THE INVENTION

It is, therefore, an obJective of the present invention to provide an apparatus capable of reading information presented on the front and back surfaces of a document to be read with a single image pickup means without requiring any reversing operation of the subject.

In order to achieve the above mentioned objective, document sensing apparatus in accordance with the present invention comprises a means for feeding a document to be read, sources of light for illuminating both surfaces of the document, and a light intermitting means for alternately passing a beam of light reflected by the one surface of the subject and a beam of light reflected from the other surface thereof to an image sensor such as a linear CCD.

DETAILED DESCRIPTION OF THE PREFERRED EMBODIMENT

Figure 1A:
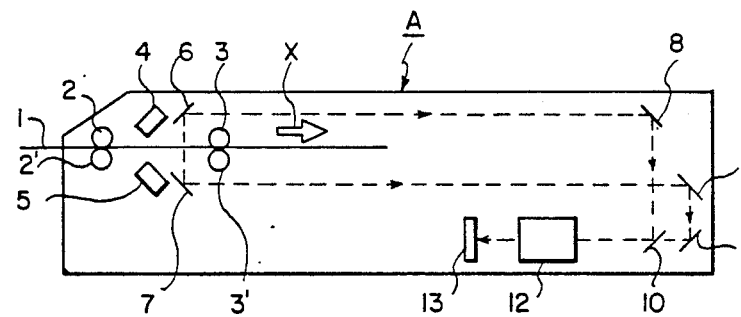
FIGS. 1a and 1b respectively show front and plan views of the main components of the first embodiment of an apparatus for sensing document information in accordance with the present invention.
Figure 1B:
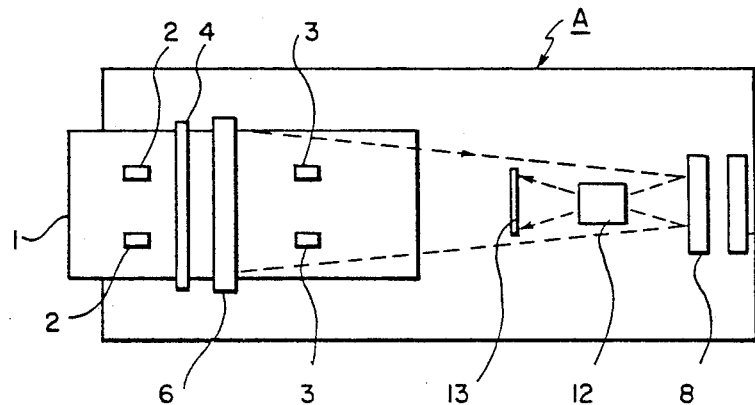

FIGS. 1a and 1b are front and plan views, respectively, for illustrating the disposition of the main components of the first embodiment of the present invention, wherein an original document in the form of a sheet 1 is inserted into a slot formed in one end of the apparatus for sensing information A, and then fed in the direction shown by an arrow X by pairs of rollers 2, 2' and 3, 3' provided in appropriate positions for pinching the original 1 on its upper or front and lower or back surfaces. In order to sense the information existing on the front and back surfaces of the sheet 1 while it is moved between the rollers 2, 2' and 3, 3' , an array of light emitting elements 4 for illuminating the front surface of the original sheet 1 is disposed perpendicular to the direction of movement of the latter, another array of light emitting elements 5 for illuminating the back surface of the sheet 1 being also provided in the position opposite to the array 4 with respect to the original sheet 1. Each of the arrays 4 and 5 includes a plurality of LEDs arranged in a line of a length corresponding to the width of the original sheet 1.

Figure 2A:
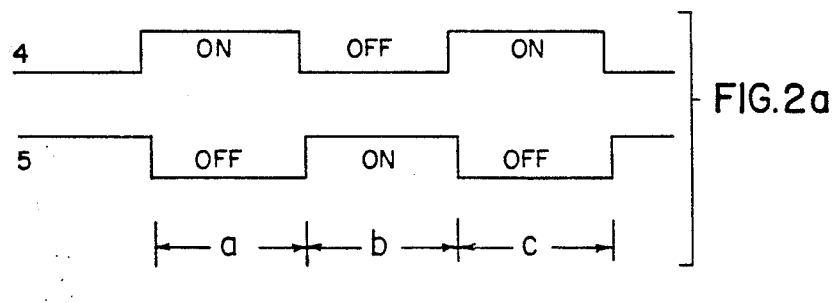
FIGS. 2a and 2b are used for explaining an operation of the apparatus of FIG. 1.
Figure 2B:
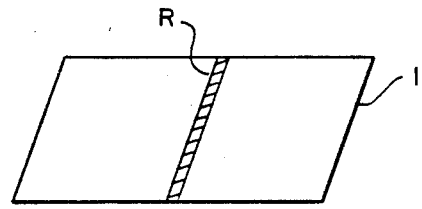

The arrays of light emitting elements 4 and 5 are controlled by a suitable control circuit (not shown) so that they are alternately turned on and off at regular intervals. Thus, as shown in FIG. 2a, when the array of light emitting elements 4 is turned on the array of light-emitting elements 5 is turned off (the intervals a and c of FIG. 2a). On the other hand when the array of light-emitting elements 4 is turned off, the array of light-emitting element 5 is turned on (the interval b of FIG. 2a). When either array of light-emitting elements 4 or 5 is turned on, a narrow elongate area R (the hatched portion of FIG. 2b) of the front or back surface of the original sheet 1 is illuminated and the information existing on the area R is read. The area R is located perpendicular to the direction of movement of the original sheet 1. Thus, by appropriately choosing the speed of movement of the original sheet 1 and the interval of turning on and off of the arrays of light-emitting elements 4, 5, the whole front and back surfaces of the original sheet 1 are sequentially illuminated as the original sheet moves, and all the information can be sensed. After the sensing has been completed with the aid of the arrays of light-emitting elements 4, 5, the original sheet 1 is fed through a predetermined path to a sheet receiver tray (not shown). Light reflected from the elongate areas R on the front and back surfaces of the original sheet 1 illuminated by the arrays of light-emitting elements 4, 5 are reflected by mirrors 6, 7 disposed parallel to the arrays 4, 5 on the upper and lower sides of the original sheet 1, and then propagate in the direction of the arrow X. The apparatus for sensing information A is further provided at its opposite end with a mirror 8 for reflecting downwardly the light which has been reflected by the mirror 6, and also with a mirror 9 for similarly reflecting downwardly the light which has been reflected by the mirror 7, the mirror 9 being positioned further from the original sheet 1 than the mirror 8. Light reflected by the mirror 8 is further reflected by a half mirror 10 positioned in a lower portion of the apparatus A, and then focused through lens 12 onto a one-dimensional image sensing means shown as pickup element 13. Element 13 can be a conventional CCD linear image sensor which senses a line of information at a time. Similarly, light reflected by the mirror 9 is further reflected by a mirror 11 positioned in a lower portion of the apparatus A, and transmitted through the half mirror 10 and thereafter focused through the lens 12 onto the element 13.

The front and back surfaces of sheet 1 are scanned by beams of light in the period during which the array of light-emitting elements 4 and 5 are turned on and the one-dimensional image pickup element 13 outputs electrical signals corresponding to the images focused on the image pickup element; that is, electric signal which represent the line of pixel information contained in the narrow areas R illuminated by the arrays 4 and 5. The operation of the one-dimensional image pickup element 13 is controlled by synchronizing the movement of the sheet 1 with the alternate on-off operation of the arrays of light-emitting elements 4 and 5.

As will be understood from the above description, the information existing on the front and back surfaces of the original sheet 1 is sensed sequentially line by line when the original sheet 1 is moved by the rollers 3, 3' between the arrays of light-emitting elements 4 and 5, and then alternatively focused on the one-dimensional image pickup element 13 through the half mirror 11 and the lens 12. This makes it possible to avoid a troublesome reversing operation of the original sheet and to sense the information on both the front and back surfaces of the sheet using a single image accepting element.

Figure 3:
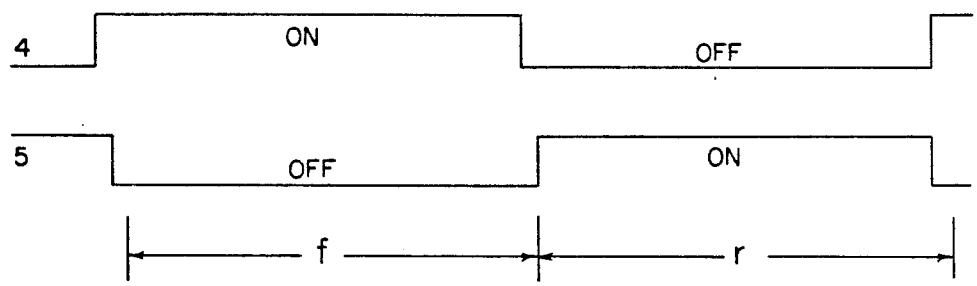
FIG. 3 is used for explaining another operation of the document sensing apparatus of FIG. 1.

As shown in FIG. 3, furthermore, it is also possible to arrange that only the array of light-emitting elements 4 is left on for illuminating the front surface of the original sheet 1 during the period when the original sheet moves in one direction by a distance corresponding to the whole length of the original sheet (interval f), and thereafter only the array of light-emitting elements 5 is left on for illuminating the back surface of the original sheet 1 during a subsequent period when the original sheet returns in the opposite direction (interval r). This also makes it possible to sense the information on both the front and back surfaces of the original sheet with a single image pickup element without reversing the original sheet.

Figure 4:
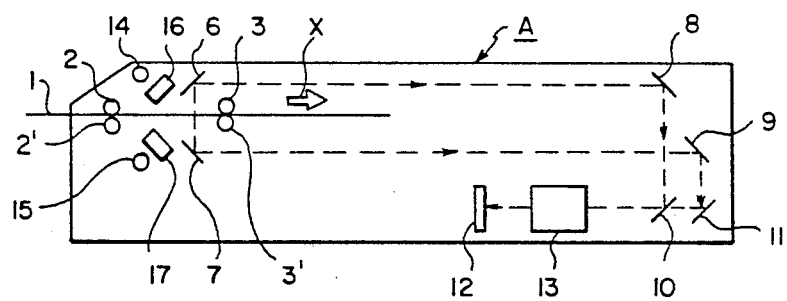
FIG. 4 is a front view showing the disposition of the main components of the second embodiment of an apParatus for sensing information in accordance with the present invention.

FIG. 4 is a front view showing the disposition of the main components of the second embodiment of a document information sensing apparatus in accordance with the present invention. In this second embodiment, in place of the arrays of light-emitting elements 4 and 5 of the first embodiment, a pair of light sources 14 and 15 are provided. These light sources are disposed on the front and back sides of the original sheet 1, and left on in operation. A pair of conventional liquid crystal shutters 16 and 17 are provided between the light sources 14, 15 and the original sheet 1. When the liquid crystal shutters 16 and 17 are operated to alternately open and close in synchronism with the scanning timing of the one-dimensional image pickup element 13, and the speed of movement of the original sheet 1 is appropriately set, it is possible, as in the first embodiment, to sense the information both on the front and back surfaces of the original sheet with a single image pickup element without reversing the original sheet.

Figure 5:
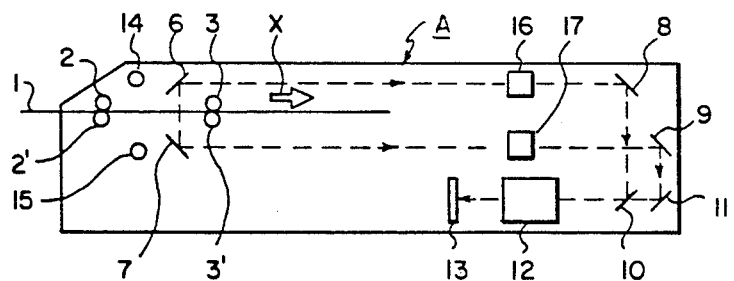
FIG. 5 is a front view showing the disposition of the main components of the third embodiment of an apparatus for sensing information in accordance with the present invention.

FIG. 5 is a front view showing the disposition of the main components of the third embodiment of an information sensing apparatus in accordance with the present invention, in which the liquid crystal shutter 16 of the second embodiment is disposed in the light path between the mirrors 6 and 8, and the liquid crystal shutter 17 also in the light path between the mirrors 7 and 9.

Figure 6:
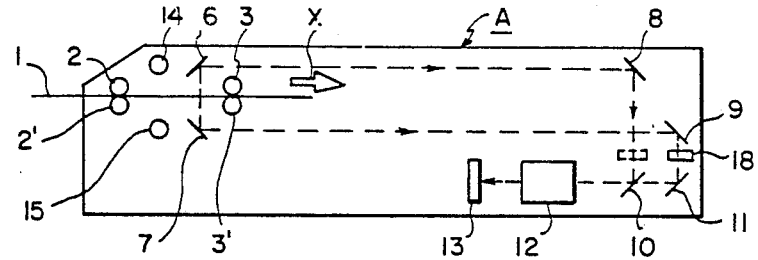
FIG. 6 is a front view showing the disposition of the main components of the fourth embodiment of an apparatus for sensing information in accordance with the present invention.
Figure 7A:
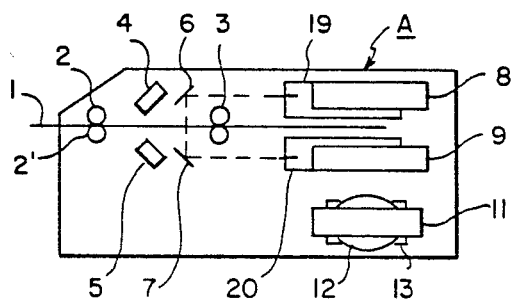
FIGS. 7a, 7b and 7c being a front view, plan view and a right side elevation, respectively, of the fifth embodiment of an apparatus for sensing information in accordance with the present invention.
Figure 7B:
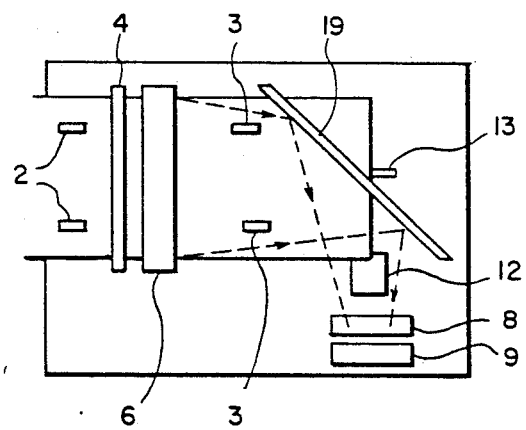
Figure 7C:
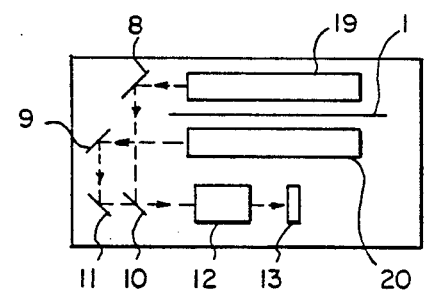

FIG. 6 is a front view showing the disposition of the main components of the fourth embodiment of document information sensing apparatus in accordance with the present invention. As with the third embodiment, the fourth embodiment is also arranged to illuminate the original sheet 1 with the light sources 14, 15 which are left on, but a light-interrupting element 18 is provided in place of the liquid crystal shutters 16, 17. The light-interrupting element 18 is movable between one position in which it interrupts light reflected on the front surface of the original sheet 1 and then directed to the one-dimensional image pickup element 13, and another position in which it interrupts light reflected on the back surface of the original sheet 1 and then directed to the one-dimensional image pickup element 13, so that the element 18 is in one position during the period of interval f shown in FIG. 3, for example, and then also in the other position during the period of interval r, thereby allowing the information on both the front and back surfaces of the original sheet 1 to be read FIGS. 7a, 7b and 7c are front, plan and side views, respectively, showing the disposition of the main components of the fifth embodiment of an information sensing apparatus in accordance with the present invention. The fifth embodiment is intended to provide means for making the apparatus compact and is effectively applicable to the information reading apparatus of any one of the first to fourth embodiments described above. As an example, a case in which such means is applied to the first embodiment will be described below. As in the first embodiment, light reflected from the front and back surfaces of the original sheet 1 are reflected by the mirrors 6 and 7, respectively, and then directed in the same direction as that of the movement of the original sheet 1 to mirrors 19 and 20. These mirrors are respectively disposed in the paths of propagation of those light beams at the angle of 45 degrees with respect to the paths of light beams on the upper and lower sides of the plane including the original sheet 1. Thus, the light beam from the mirror 6 is reflected by the mirror 19 and the light beam from the mirror 7 is also reflected by the mirror 20, and each of the reflected beams is directed in the direction perpendicular to the direction of movement of the original sheet 1 along the plane of the original sheet 1 (towards the viewer seeing FIG. 7a)

The light beam reflected by the mirrors 19, 20 are further reflected by the mirrors 8, 9 downwardly at right angles. The mirrors 8, 9 are positioned on the front side of the information sensing apparatus A such that the light beams reflected by the mirrors 8, 9 are not interrupted by the moving original sheet 1. The light reflected by the mirror 8 is further directed at right angles by the half mirror 10 and directed towards the rear side of the apparatus A to impinge on the lens 12. The light beam reflected by the mirror 9 is also reflected at right angles by the mirror 11 and directed towards the rear side of the apparatus A to transmit through the half mirror 10 and impinge on the lens 12.

Each of the beams which have passed through the lens 12 is focused on the one-dimensional image pickup element 13.

In this manner, the direction of the light beams reflected on the front and back surfaces of the original sheet 1 and reaching the one-dimensional image pickup element 13 is changed by 90 degrees with respect to the direction of movement of the original sheet 1 in the midst of the light path and further downwardly on one side of the apparatus A to avoid intersection of the light path with the path of movement of the original sheet 1. Therefore, the information can be read while the original sheet 1 is moving from one end to the opposite end of the apparatus A and the apparatus can be reduced in size regardless of the length of the original sheet 1.

Although the description has been made with reference to examples of the apparatus for sensing information existing on original sheets, the present invention is not limited to such examples, but can be applicable to apparatus for sensing information recorded on relatively flat media documents such as photographs. Therefore, the recording media from which the information can be sensed by the apparatus of the present invention may generally be referred to as subjects to be read.

As will be apparent from the above detailed description on the present invention with reference to some of its embodiments, the apparatus of the invention can alternately sense information existing on the front and back surfaces of a subject to be read using a single image pickup element without reversing the subject. Thus, it is possible to inexpensively manufacture the apparatus, minimize the operator's participation and simplify the operation of the apparatus. It is also possible to simultaneously complete the reading of information on the front and back surfaces of a document to be sensed by synchronizing the on off operation of the light sources with the scan timing of the image pickup element.

The invention has been described in detail with particular reference to a certain preferred embodiment thereof, but it will be understood that variations and modifications can be effected within the spirit and scope of the invention.

What is claimed is:

1. Apparatus for sensing information existing on the top and bottom surfaces of a document comprising:
   a one-dimensional image sensor;
   means for feeding a document relative to said image sensor;
   first and second light sources respectively illuminating the top and bottom surfaces of the document;
   light intermitting means for alternately passing light reflected by one of the surfaces of such document and then light reflected by the other surface thereof; and
   an optical system operating to focus the beams of light reflected by the respective surfaces of the document onto said image sensor.

2. An apparatus as set forth in claim 1 wherein said optical system includes mirrors for changing the direction of propagation of reflected light so as not to intersect the path of propagation of said reflected light with the path of a document.

3. Apparatus for sensing information existing on the top and bottom surfaces of a document comprising:
   means for feeding documents along a path;
   a first source of light for illuminating the top surface of a document;
   a second source of light for illuminating the bottom surface of such document;
   control means for alternately controlling illumination of light emitted from said first and second sources of light;
   a first optical system for conducting light emitted from said first source of light and reflected by the top surface of such document;
   a second optical system for conducting light emitted from said second source of light and reflected by the bottom surface of such document;
   half mirror means disposed in the paths of light outputted from said first and second optical systems for reflecting light from said first optical system and transmitting light from said second optical system; and
   one-dimensional image sensing means disposed to receive light from said half mirror means.

4. An apparatus as set forth in claim 3 wherein each of said first and second sources of light is an array of LEDs disposed relative to the path of feeding documents and wherein said control means causes said first and second sources of light to be alternately turned on 5. An apparatus as set forth in claim 3 wherein said first and second sources of light are both always left on and said control means includes shutters operating to open and close so as to alternately pass the light from said first and second sources of light.

6. An apparatus as set forth in claim 3 wherein said control means includes a light interrupting element disposed on the output side of said first and second optical systems and operable to move such as to alternately pass light outputted from said first and second optical systems.

* * * * *